United States Patent [19]
Cohen et al.

[11] Patent Number: 5,722,230
[45] Date of Patent: Mar. 3, 1998

[54] CENTER BURNER IN A MULTI-BURNER COMBUSTOR

[75] Inventors: Mitchell Cohen, Troy; Masayoshi Kuwata, Ballston Lake; Charles E. Steber, Scotia; Warren J. Mick, Altamont, all of N.Y.

[73] Assignee: General Electric Co., Schenectady, N.Y.

[21] Appl. No.: 512,581

[22] Filed: Aug. 8, 1995

[51] Int. Cl.⁶ .................. F02C 3/00; F02G 3/00
[52] U.S. Cl. .................. 60/39.37; 60/737; 60/739; 60/746
[58] Field of Search ............... 60/39.37, 737, 60/739, 746, 747, 748

[56] References Cited

U.S. PATENT DOCUMENTS

| 5,259,184 | 11/1993 | Borkowicz et al. | |
| 5,339,635 | 8/1994 | Iwai et al. | 60/746 |
| 5,361,586 | 11/1994 | McWhirter et al. | 60/739 |
| 5,415,000 | 5/1995 | Mumford et al. | 60/747 |

FOREIGN PATENT DOCUMENTS

| 119423 | 9/1981 | Japan | 60/39.37 |

OTHER PUBLICATIONS

"Dry Low No$_x$ Combustion For GE Heavy-Duty Gas Turbines", Davis et al., GE Turbine Reference Library (GER-3568A) Date Unknown.

*Primary Examiner*—Charles G. Freay
*Attorney, Agent, or Firm*—Nixon & Vanderhye

[57] ABSTRACT

In a gas turbine having a plurality of combustors, each having an annular array of outer fuel nozzles arranged about a center axis, an improved construction is provided wherein each combustor has a center nozzle located on the center axis. Various methods of operating the improved combustor are also disclosed. For example, one method of operating a combustor for a gas turbine wherein the combustor has a plurality of fuel nozzles in an annular array arranged about a center axis and has a center nozzle located on the center axis, and wherein the annular array is supplied with fuel from at least one pre-mix fuel manifold, and further wherein the center nozzle is supplied with fuel from a center nozzle pre-mix fuel manifold includes the steps of:

a) at ignition, supplying the center nozzle with fuel from the center nozzle pre-mix fuel manifold and two of the outer fuel nozzles in line with cross-fire tubes with fuel from at least one pre-mix fuel manifold;

b) after detecting cross-fire with flame detectors, turning off fuel to the outer two cross-fire nozzles, supplying all fuel to the center nozzle, and accelerating through FSNL to a part load by increasing fuel flow to the center nozzle;

c) at the part load, begin transferring some pre-mix fuel away from the center nozzle and staging it to the outer fuel nozzles in the following sequence as total fuel flow is increased: 1) center nozzle+two cross-fire nozzles, 2) center nozzle+non-cross-fire nozzles, 3) all outer fuel nozzles in annular array (no center nozzle), and 4) center nozzle+all outer fuel nozzles.

1 Claim, 7 Drawing Sheets

CENTER BURNER IN A MULTI-BURNER COMBUSTOR

TECHNICAL FIELD

This invention relates to a single stage, multi-burner combustor for a gas turbine designed to improve turndown, emissions, stability, dynamics, and pressure drop over various pans of the combustor's load range in both pre-mixed and diffusion modes of operation.

BACKGROUND PRIOR ART

U.S. Pat. No. 5,259,184 describes a configuration for a dual mode, single stage multi-burner combustor designed to achieve low NOx emissions in a pre-mixed operating mode. The invention describes an annular arrangement of fuel nozzles and pre-mixing tubes about the longitudinal axis of the combustor.

Commonly owned, co-pending application Ser. No. 08/258,041 filed Jun. 10, 1994 and commonly owned, co-pending application Ser. No. 08/258,112 filed Jun. 10, 1994, both of which are incorporated herein by reference, describe methods of fuel staging in a multi-burner combustor to improve emissions, dynamics and stability. The '112 application describes a method of fuel staging for a five burner combustor in which the nozzle in one of the five annularly arranged burners is fueled independently of the nozzles in the other four burners which are fed from a common manifold. The fuel from all of the nozzles is injected from radial pegs downstream of a swirler on the nozzle. This first type of staging varies the percent of fuel between the one and the four nozzles in order to improve dynamics and stability of the combustor during the transfer from diffusion to pre-mixed mode and in full pre-mixed mode.

The '041 application describes the addition of a third pre-mix fuel manifold that supplies fuel equally to all five annularly arranged burners, but which introduces the fuel from radial fuel pegs located upstream of the nozzle swirlers. The second type of staging varies the percent of fuel injected on the upstream versus the downstream side of the swirler. This type of fuel staging is used to reduce combustion dynamics but does so without incurring increases in NOx emissions associated with staging between the one and the four nozzles.

Various problems have been experienced with dual mode, single stage, multi-burner combustors. For example, (1) During turn-down in pre-mixed operation of multi-burner combustors, the reduction in fuel/air ratio below a critical point causes a sharp increase in carbon monoxide (CO) and unburned hydrocarbon (UHC) emissions and also decreases the stability of the pre-mix flame, ultimately resulting in blow-out.

(2) During low load diffusion operation, multi-burner combustors tend to generate very high CO and UHC emissions. This problem occurs because the combustor is typically optimized for pre-mixed operation. The diffusion nozzles do not enable very good mixing of the fuel and the air to occur, resulting in the poor emissions.

(3) Optimization of the combustor for pre-mixed operation also has a tendency to reduce diffusion mode flame stability during very low load operation, and can make the combustor prone to blow-out near full speed, no load.

(4) The design of multi-burner combustors for low NOx emissions requires that a high percentage of the combustor air flows through the head end in order to achieve lean fuel-air mixtures. The large air flow results in a high air velocity and large pressure drop across the swirlers in the burner tubes. The high pressure drop impacts gas turbine performance by reducing both efficiency and output.

DISCLOSURE OF THE INVENTION

It is the objective of this invention to solve the above noted problems associated with dual mode, single stage, multi-burner combustors. More specifically, the invention seeks to (1) extend the turn-down of a multi-burner combustor in pre-mixed operation without adversely affecting emissions, dynamics, or stability; and (2) improve the emissions and stability of a multi-burner combustor during low load operation on gas.

In the exemplary embodiment described herein, a separately fueled center burner is added to a multi-burner gas turbine combustor, along the center axis of the combustor with the annular array of burners in concentric relation therewith. This new construction provides several advantages as well as flexibility in choice of operating modes, from start up through full load operation, as described further herein.

For example, the invention allows staging of fuel to only the center burner to help reduce CO and UHC emissions and to improve stability during part speed and low load operation. This center burner-only operation can be carried out with the burner fueled in a pre-mixed mode (preferred embodiment).

At intermediate loads (approximately 30–50% load), the staging of fuel through a center burner during pre-mixed operation can extend the turn-down of the combustor while still maintaining good NOx, CO and UHC emissions. By reducing the percentage of total fuel to the center burner as the total fuel to the combustor is reduced, a flammable fuel/air mixture can be maintained in the remaining burners down to a lower combustor exit temperature than would otherwise be possible. In effect, the pre-mixing is done with only part of the air, and the CO and UHC emissions can be held at acceptable levels to a lower overall combustor fuel/air ratio.

The addition of a center burner to a multi-burner combustor also provides a means of increasing flow area and reducing combustor pressure drop without increasing the combustor size. For a combustor having an annular array of burners in which the burner size has been maximized, adding flow area through a center burner is a cheaper alternative to increasing the combustor diameter. The lower combustor pressure drop results in increased gas turbine output and efficiency.

The overall arrangement of the dual mode, single stage, multi-burner combustor useful in this invention is similar to that which is described in the aforementioned U.S. Pat. No. 5,259,184. In the present invention as already noted above, the center burner is added on the center axis of the combustor, surrounded by the five (or other number of) existing burners. The center burner may have the same physical arrangement as the surrounding burners, but it does not have to be of the same size or have the same amount of air flow. Alternatively, the center burner does not necessarily have to have the same physical construction as those used in the outer burners.

In the exemplary embodiment, the fuel nozzle in the center burner is fueled through a manifold that is separate from the manifold(s) that fuel the nozzles in the surrounding burners. Thus, the proportion of fuel between the center and the outer nozzles is continuously variable between 0% and 100% to either location.

Additional details as to the manner of operation of the multi-burner combustor employing a center burner in accordance with this invention is described further herein below.

In its broader aspects, the present invention relates to a single stage, i.e., single burning zone, gas turbine combustor capable of operating in pre-mix and diffusion modes having an annular array of nozzles arranged about a center axis, the improvement comprising a center nozzle located on the center axis.

In another aspect, the invention relates to a method of operating a combustor for a gas turbine wherein the combustor has a plurality of fuel nozzles in an annular array arranged about a center axis and has a center nozzle located on the center axis, and wherein the annular array is supplied with fuel from at least one pre-mix fuel manifold, and further wherein the center nozzle is supplied with fuel from a center nozzle pre-mix fuel manifold comprising the steps of:

a) at ignition, supplying the center nozzle with fuel from the center nozzle pre-mix fuel manifold and the two nozzles in line with the cross-fire tubes with fuel from one of the pre-mix fuel manifolds;

b) after detecting cross-fire with the flame detectors, turning off fuel to the two outer fuel nozzles, and supplying all fuel to the center nozzle. Acceleration to full speed, no load (FSNL) and loading to part load occurs by increasing fuel flow to center nozzle;

c) at some part load, begin transferring some pre-mix fuel away from the center nozzle and staging it to the outer fuel nozzles in the following sequence as total fuel flow is increased: 1) center nozzle + two cross-fire nozzles, 2) center nozzle +non-cross-fire nozzles, 3) all outer fuel nozzles in annular array (no center nozzle), and 4) center nozzle + all outer fuel nozzles.

In another aspect, the invention relates to a method of operating the combustor wherein the combustor has a plurality of fuel nozzles in an annular array arranged about a center axis and a center nozzle located on the center axis, and wherein the annular array is supplied with fuel from a diffusion fuel manifold and at least one pre-mix fuel manifold, and further wherein the center nozzle is supplied with fuel from a center nozzle pre-mix fuel manifold comprising the steps of:

a) at start-up, supplying at least some of the fuel nozzles in the annular array with diffusion fuel from the diffusion fuel manifold;

b) at part speed, supplying pre-mix fuel from at least one pre-mix manifold to one of the nozzles in the annular array;

c) at full speed, part load, transferring those of the fuel nozzles in the annular array supplied with diffusion fuel in step a) to pre-mix fuel;

d) as load is increased, initiating pre-mix fuel supply to the center nozzle without adding to the supply of pre-mix fuel to the fuel nozzles in the annular array; and then e) supplying additional pre-mix fuel to all of the fuel nozzles in the annular array and the center nozzle to thereby uniformly increase the fuel/air ratio as the turbine load increases.

Other objects and advantages of the present invention will become apparent from the detailed description which follows.

BEST MODE FOR CARRYING OUT THE INVENTION

Figure 1:
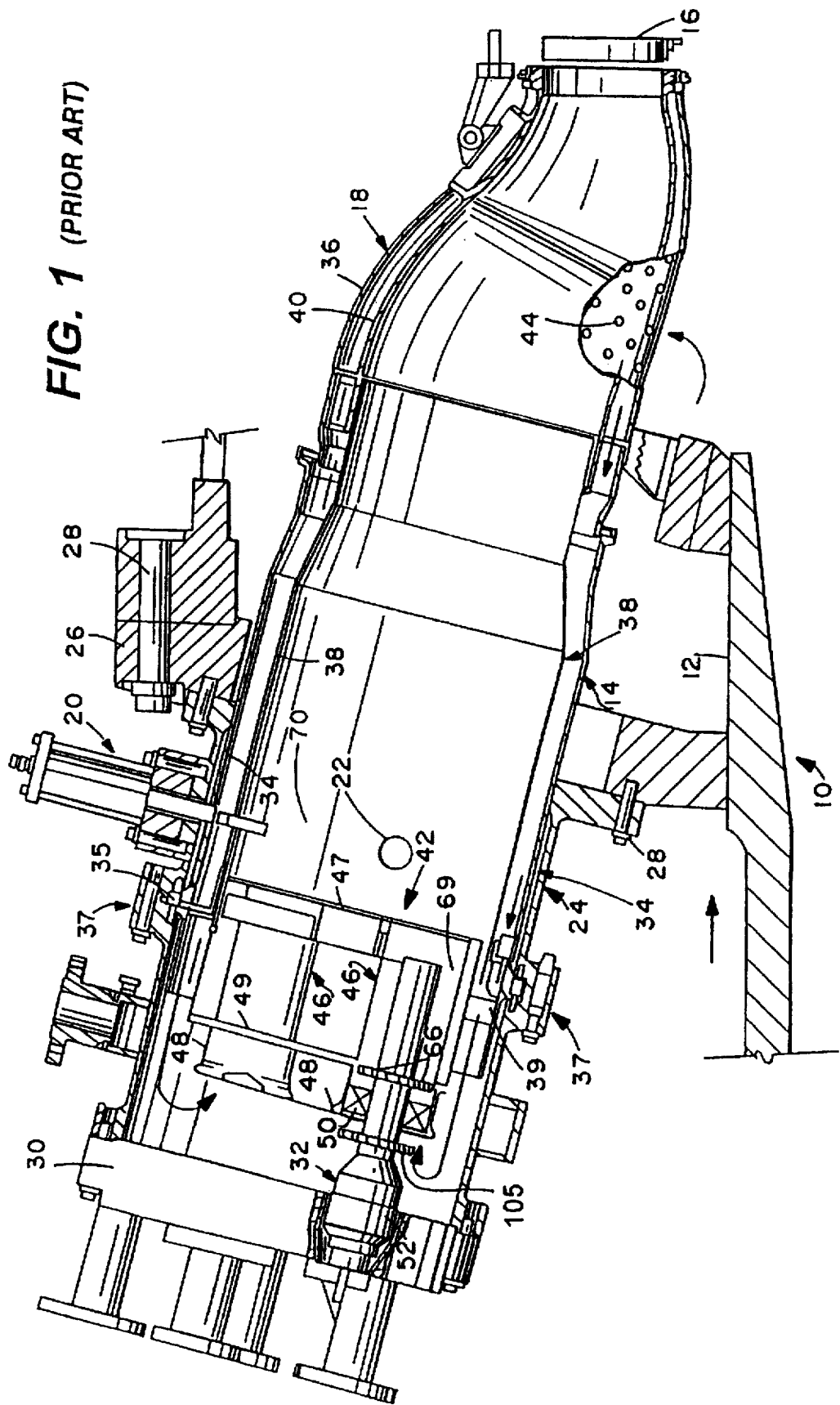
FIG. 1 is a partial section through a conventional dual mode, single stage, multi-burner combustor.

With reference now to FIG. 1, the gas turbine 10 includes a compressor 12 (partially shown), a plurality of combustors 14 (one shown), and a turbine represented here by a single turbine blade 16. Although not specifically shown, the turbine is drivingly connected to the compressor blading along a common axis as is well known in the art. The compressor pressurized air is reverse flowed to the combustor 14 where it is used to cool the combustor and to provide air to the combustion process.

As noted above, the gas turbine includes a plurality of combustors 14 located about the periphery of the gas turbine. A double-walled transition duct 18 connects the outlet end of each combustor with the inlet end of the turbine to deliver the hot products of combustion to the turbine.

Ignition is achieved in the various combustors 14 by means of spark plug 20 in conjunction with cross fire tubes 22 (one shown) in the usual manner.

Each combustor 14 includes a substantially cylindrical combustion casing 24 which is secured at an open forward end to the turbine casing 26 by means of bolts 28. The rearward end of the combustion casing is closed by an end cover assembly 30 which may include conventional supply tubes, manifolds and associated valves, etc. for feeding gas, liquid fuel and air (and water if desired) to the combustor as described in greater detail below. The end cover assembly 30 receives a plurality (for example, five) fuel nozzle assemblies 32 arranged in a circular or annular array about a longitudinal axis of the combustor (see FIG. 5).

Within the combustor casing 24, there is mounted, in substantially concentric relation thereto, a substantially cylindrical flow sleeve 34 which connects at its forward end to the outer wall 36 of the double walled transition duct 18. The flow sleeve 34 is connected at its rearward end by means of a radial flange 35 to the combustor casing 24 at a butt joint 37 where fore and aft sections of the combustor casing 24 are joined.

Within the flow sleeve 34, there is a concentrically arranged combustion liner 38 which is connected at its forward end with the inner wall 40 of the transition duct 18. The rearward end of the combustion liner 38 is supported by a combustion liner cap assembly 42 which is, in turn, supported within the combustor casing by a plurality of struts 39 and associated mounting flange assembly 41 (best seen in FIG. 5). It will be appreciated that the outer wall 36 of the transition duct 18, as well as that portion of flow sleeve 34 extending forward of the location where the combustion casing 24 is bolted to the turbine casing (by bolts 28) are formed with an array of apertures 44 over their respective peripheral surfaces to permit air to reverse flow from the compressor 12 through the apertures 44 into the annular space between the flow sleeve 34 and the liner 38 toward the upstream or rearward end of the combustor (as indicated by the flow arrows shown in FIG. 1).

Figure 5:
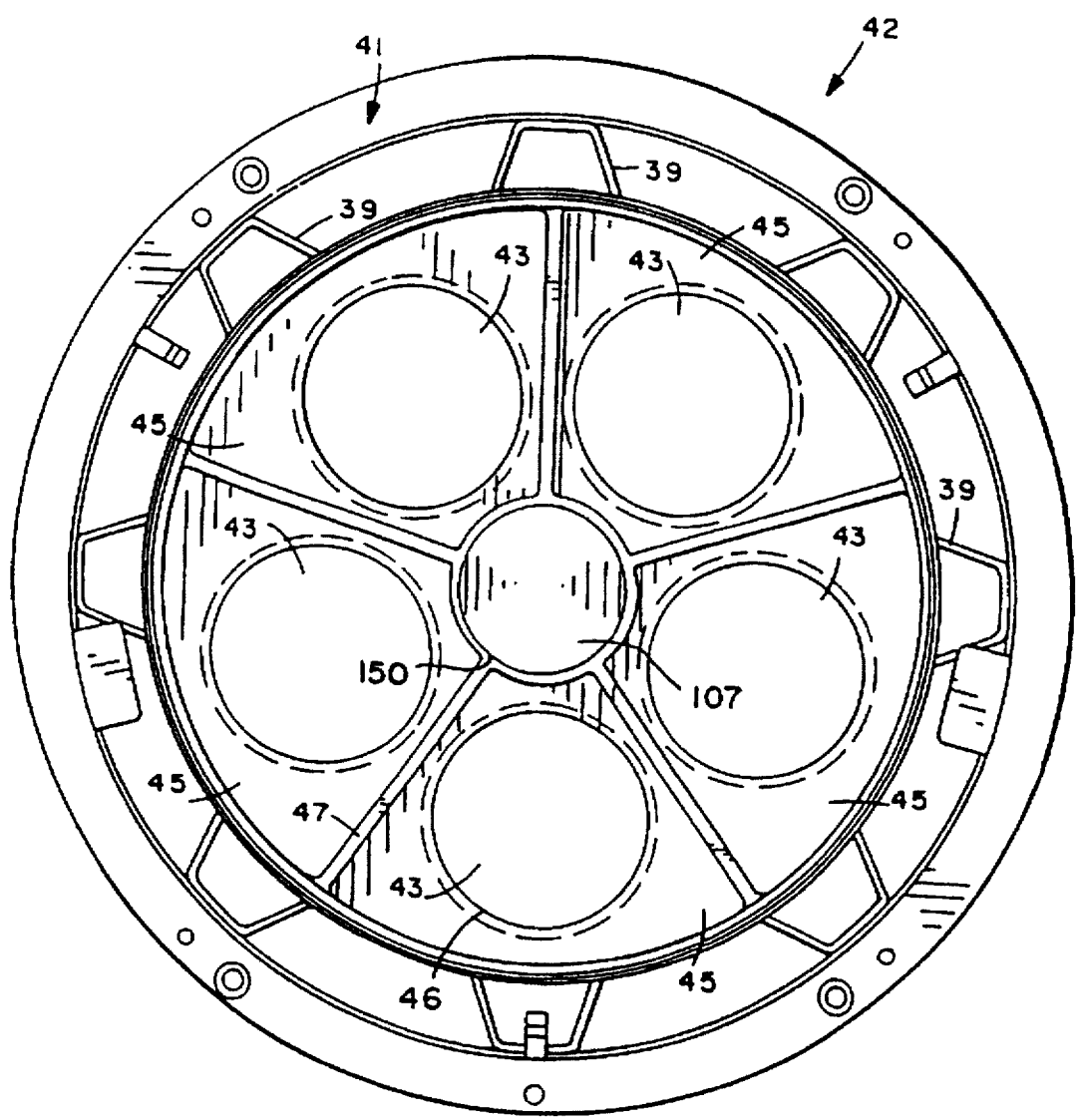
FIG. 5 is a simplified end view of a conventional multi-burner combustor of the type utilized in FIG. 1, without a center burner.

The combustion liner cap assembly 42 supports a plurality of pre-mix tubes 46, one for each fuel nozzle assembly 32. More specifically, each pre-mix tube 46 is supported within the combustion liner cap assembly 42 at its forward and rearward ends by front and rear plates 47, 49, respectively, each provided with openings aligned with the open-ended pre-mix tubes 46. This arrangement is best seen in FIG. 5, with openings 43 shown in the front plate 47. The front plate 47 (an impingement plate provided with an array of cooling apertures) may be shielded from their thermal radiation of the combustor flame by shield plates 45.

The rear plate 49 mounts a plurality of rearwardly extending floating collars 48 (one for each pre-mix tube 46, arranged in substantial alignment with the openings in the rear plate), each of which supports an air swirler 50 in surrounding relation to the fuel nozzle assembly 32. The arrangement is such that air flowing in the annular space between the liner 38 and flow sleeve 34 is forced to again reverse direction in the rearward end of the combustor (between the end cover assembly 30 and liner cap assembly 42) and to flow through the swirlers 50 and pre-mix tubes 46 before entering the burning zone within the liner 38, downstream of the pre-mix tube 46.

Figure 2:
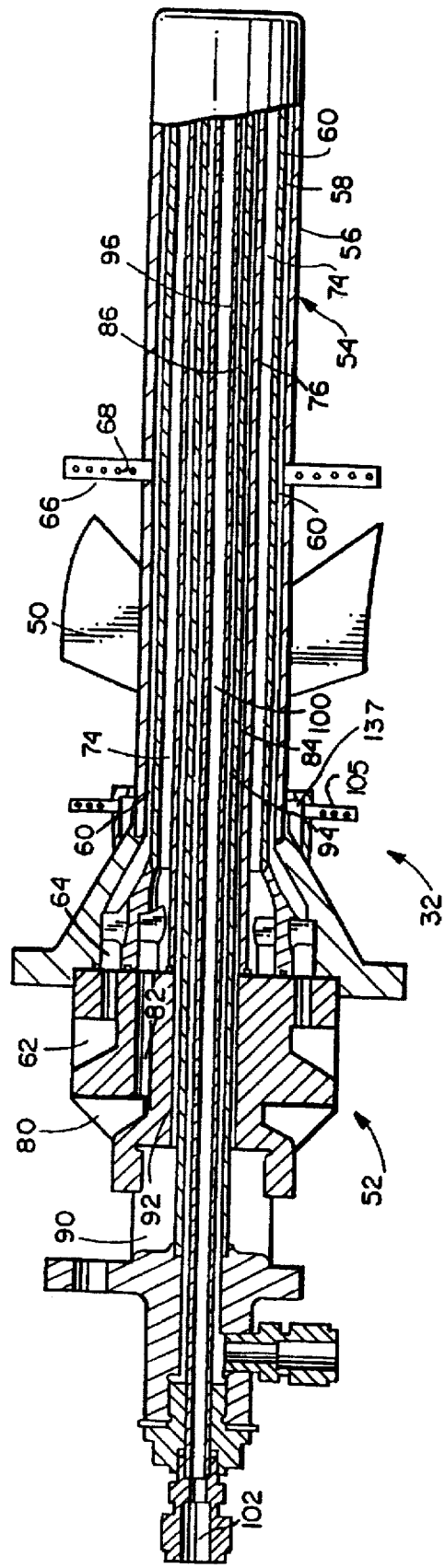
FIG. 2 is a sectional view of a fuel injection nozzle of the type which may be used in the invention.
Figure 3:
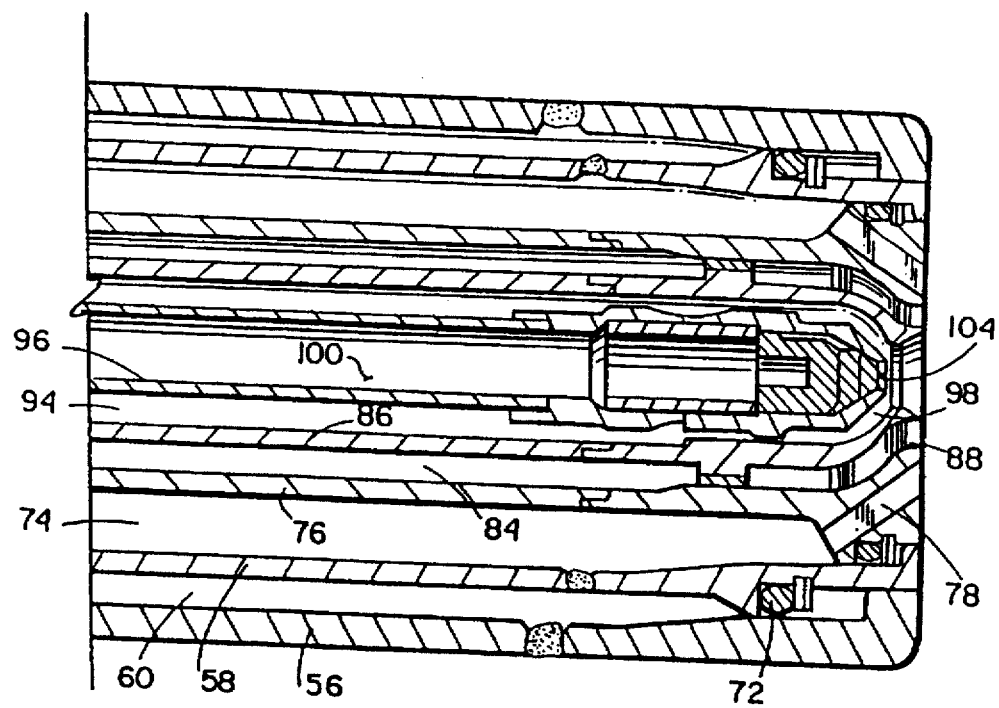
FIG. 3 is an enlarged end detail of the nozzle shown in FIG. 2.
Figure 4:
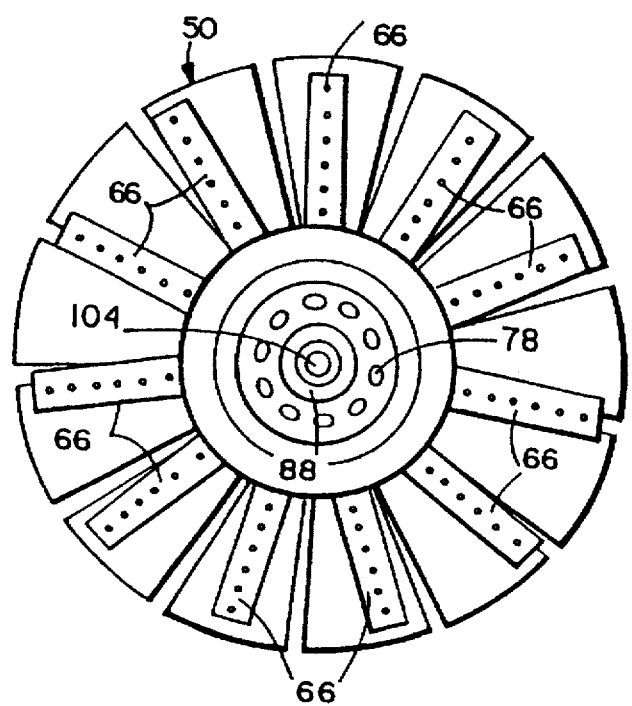
FIG. 4 is a front end view of the nozzle shown in FIG. 2.

Turning to FIGS. 2, 3 and 4, each fuel nozzle assembly 32 includes a rearward supply section 52 with inlets for receiving liquid fuel, atomizing air, diffusion gas fuel and pre-mix gas fuel, and with suitable connecting passages for supplying each of the above mentioned fluids to a respective passage in a forward delivery section 54 of the fuel nozzle assembly, as described below.

The forward delivery section 54 of the fuel nozzle assembly is comprised of a series of concentric tubes. The two radially outermost concentric tubes 56, 58 provide a pre-mix gas passage 60 which receives pre-mix gas fuel from an inlet 62 connected to passage 60 by means of conduit 64. The pre-mix gas passage 60 also communicates with a plurality (for example, eleven) radial fuel injectors 66, each of which is provided with a plurality of fuel injection ports or holes 68 for discharging gas fuel into a pre-mix zone 69 (FIG. 1) located within the pre-mix tube 46. The injected fuel mixes with air reverse flowed from the compressor 12, and swirled by means of the annular swifter 50 surrounding the fuel nozzle assembly upstream of the radial injectors 66.

The pre-mix passage 60 is sealed by an O-ring 72 at the forward or discharge end of the fuel nozzle assembly, so that pre-mix fuel may exit only via the radial fuel injectors 66.

The next adjacent passage 74 is formed between concentric tubes 58 and 76, and supplies diffusion gas to the burning zone 70 (FIG. 1) of the combustor via orifice 78 at the forwardmost end of the fuel nozzle assembly 32. The forwardmost or discharge end of the nozzle is located within the pre-mix tube 46, but relatively close to the forward end thereof. The diffusion gas passage 74 receives diffusion gas from an inlet 80 via conduit 82.

A third passage 84 is defined between concentric tubes 76 and 86 and supplies air to the burning zone 70 via orifice 88 where it then mixes with diffusion fuel exiting the orifice 78. The atomizing air is supplied to passage 84 from an inlet 90 via conduit 92.

The fuel nozzle assembly 32 is also provided with a further passage 94 for (optionally) supplying water to the burning zone to effect NOx reductions in a manner understood by those skilled in the art. The water passage 94 is defined between tube 86 and adjacent concentric tube 96. Water exits the nozzle via an orifice 98, radially inward of the atomizing air orifice 88.

Tube 96, the innermost of the series of concentric tubes forming the fuel injector nozzle, itself forms a central passage 100 for liquid fuel which enters the passage by means of inlet 102. The liquid fuel exits the nozzle by means of a discharge orifice 104 in the center of the nozzle. It will be understood by those skilled in the art that the liquid fuel capability is provided as a back-up system, and passage 100 is normally shut off while the turbine is in its normal gas fuel mode.

The above described combustor as set forth in U.S. Pat. No. 5,259,184 is designed to act in a dual mode, single stage manner. In other words, at low turbine loads, and in each nozzle/dedicated pre-mix tube assembly, diffusion gas fuel will be fed through inlet 80, conduit 82 and passage 74 for discharge via orifice 78 into the burning zone 70 where it mixes with atomizing air discharged from passage 84 via orifice 88. This mixture is ignited by spark plug 20 and burned in the zone 70 within the liner 38. At higher loads, pre-mix gas fuel is supplied to passage 60 via inlet 62 and conduit 64 for discharge through orifices 68 in radial injectors 66. The pre-mix fuel mixes with air entering the pre-mix tube 46 by means of swirlers 50, the mixture igniting by the pre-existing flame in burning zone 70 in liner 38. During pre-mix operation, fuel to the diffusion passage 74 is shut down.

Referring again to FIGS. 1 and 2, and as described in the '041 application, there are provided a plurality of circumferentially spaced, radially extending fuel injector pegs 105 upstream of the swirlers 50 for each nozzle. As illustrated in FIG. 2, the pegs 105 lie in communication with a manifold 137 about the outer tube 56 of each nozzle. Consequently, pre-mix fuel is supplied to manifold 137 for injection into the reverse flow of air from the compressor for flow with the air through the swifter and past the downstream injectors 66. Thus, there are two axial locations for injection of the pre-mix fuel, i.e., upstream and downstream of the swirlers 50.

The invention here relates to the addition of a center pre-mix tube 150 (see FIG. 5), and center fuel nozzle 106 (see FIG. 6), located on the axis of the combustor in opening 107 (see FIG. 5), and surrounded concentrically by an annular array of five nozzle assemblies 32. Center pre-mix tube 150 is supported within the combustion liner cap assembly 42 at its forward and rearward ends by front and rear plates 47 and 49 respectively, with opening 107 aligned with center pre-mix tube 150. The center fuel nozzle 106 may be similarly constructed as the nozzle 32 shown in FIG. 2, but may also be of different construction. In other words, it is not the construction of the nozzle per se that is significant here but, rather, the addition of the nozzle in the center of the array of nozzles, and the manner in which the nozzle operates in relation to the surrounding nozzles.

Figure 6:
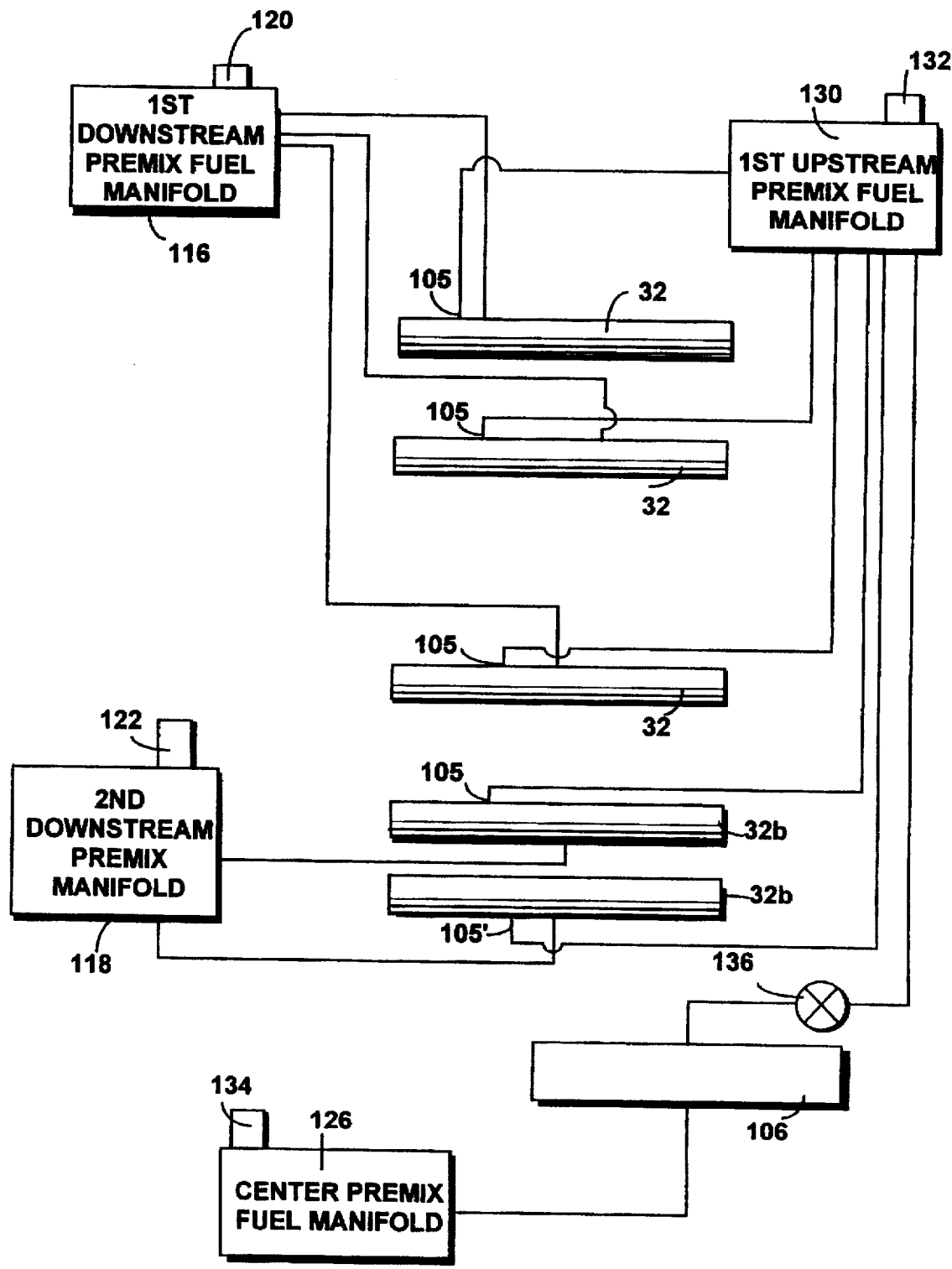
FIG. 6 is a schematic illustration of an arrangement of pre-mix fuel supply manifolds for use with the invention in the preferred embodiment.

Referring now to FIG. 6, there is schematically represented one manner (the preferred embodiment) of supplying fuel to the various nozzles. In this arrangement, all manifolds supply only pre-mix fuel to the nozzles. The above described diffusion passages 74 are still present in the nozzle, but do not ever flow fuel; instead they are continuously purged with air (typically supplied directly from the compressor discharge casing). Because the pre-mix flame is stabilized off the tip of the nozzle, the purge air is required to cool the nozzle tip.

In FIG. 6, a first downstream pre-mix manifold 116 and associated valve 120 supplies pre-mix fuel to nozzles 32 while a second downstream pre-mix manifold 118 and associated valve 122 supplies fuel to nozzles 32b located in line with the cross-fire tubes 22. Upstream pre-mix manifold 130 and associated valve 132 is arranged to supply pre-mix fuel to all of the nozzles 32 and 32b.

A center pre-mix manifold 126 and associated valve 134 supplies pre-mix fuel to center nozzle 106. The center nozzle 106 may also receive pre-mix fuel, via valve 136 from the first upstream pre-mix fuel manifold 130 as described below.

Again, with reference to FIG. 6, the preferred manner of gas turbine combustor fueling from ignition to full load in accordance with this invention will be described. At ignition, valves 134 and 122 are opened to supply fuel from manifold 126 to the center nozzle 106, and from manifold 118 to the two nozzles 32b located in line with the cross-tire tubes. Once ignition in all combustors is verified by the gas turbine flame detectors, valve 122 is closed to shut off fuel to nozzles 32b, and all fuel is redirected to the center nozzle 106. Fueling to the center nozzle only is continued through acceleration to full speed no load and beyond FSNL up to some low load condition, Ld1,~10% load. At this point, valve 122 is re-opened and valve 134 is closed down, but not fully, to redistribute the fuel from the center nozzle only to the center nozzle plus the two outer nozzles, 32b. As load further increases, fuel to both the center nozzle 106 and the two outer nozzles 32b is increased, until some higher loads Ld2~20% load. At this point, fuel is shut off to nozzles 32b by closing valve 122 and is redirected to the three outer nozzles 32, by opening valve 120 on manifold 116; the center nozzle remains fueled. Fuel flow is further increased operating on the center and the three outer nozzles up to condition Ld3,~30% load.

At this point, fuel to the center nozzle is shut off by closing valve 134, and valve 122 on manifold 118 is reopened to flow fuel to the two outer nozzles 32b. Fuel now flows to all live outer nozzles, and is distributed approximately equally. As load is further increased, two things happen. First, additional fuel is supplied only to the center nozzle until the point that the fuel/air ratio in the center nozzle is equal to the fuel/air ratio in the outer nozzles, at a mid load condition, Ld4,~50% load. Second, some of the fuel to the outer nozzles starts to be supplied through upstream pre-mixed manifold 130 by opening valve 132. As fuel is added through the upstream manifold, the fuel flow through the two downstream pre-mix manifolds is reduced so as to maintain constant fuel flow to the outer nozzles. Optionally, valve 136 may be opened to also provide upstream fuel to the center nozzle. As described in co-pending application Ser. No. 08/258,041, the purpose of injecting the upstream fuel is to reduce dynamic pressure oscillations in the combustor during full pre-mixed mode operation.

Beyond condition Ld4, the turbine is loaded to full load by adding fuel to all six nozzles in a manner that maintains equal fuel/air ratio in all nozzles.

In full pre-mixed mode (all six nozzles fueled), the presence of the center nozzle 106 allows turndown of the combustor to a lower temperature, and hence lower load, than is possible without the center nozzle, while still maintaining both low NOx and low CO and UHC emissions. The extended turndown in pre-mixed operation is achieved as described below. During high temperature operation, low NOx emissions are achieved by maintaining the same fuel/air ratio in all nozzles, both center nozzle 106 and outer nozzles 32 and 32b. The proportion of fuel to the center nozzle will be the same as its proportion of total burner air flow. At constant air flow, as total fuel is reduced while still maintaining equal fuel/air ratio in all nozzles, the nozzles begin to approach lean blow-out. This lean blow-out point occurs at the load point Ld4, mentioned above. Below the fuel/air threshold required to maintain load Ld4, CO and UHC emissions will begin to increase rapidly, and the flame will become unstable. However, by reducing the percent of fuel to the center nozzle toward zero as total fuel flow is further reduced, the local fuel/air ratio in the outer nozzles can be held at or above the blow-out threshold, while the overall combustor fuel/air ratio is reduced below the threshold level. Low CO and UHC levels can be maintained until the outer nozzle fuel/air ratio can no longer be held at or above the blow-out threshold level as total fuel is reduced. This occurs when fuel to the center nozzle has been totally shut off at the load point, Ld3, mentioned above. In other words, absent the center nozzle, turndown with low NOx and low CO and UHC could only be achieved to load Ld4. With the center nozzle, turndown with low NOx, CO, and UHC can be extended to load Ld3, approximately a 20% increase in the "full pre-mixed" load range.

Figure 7:
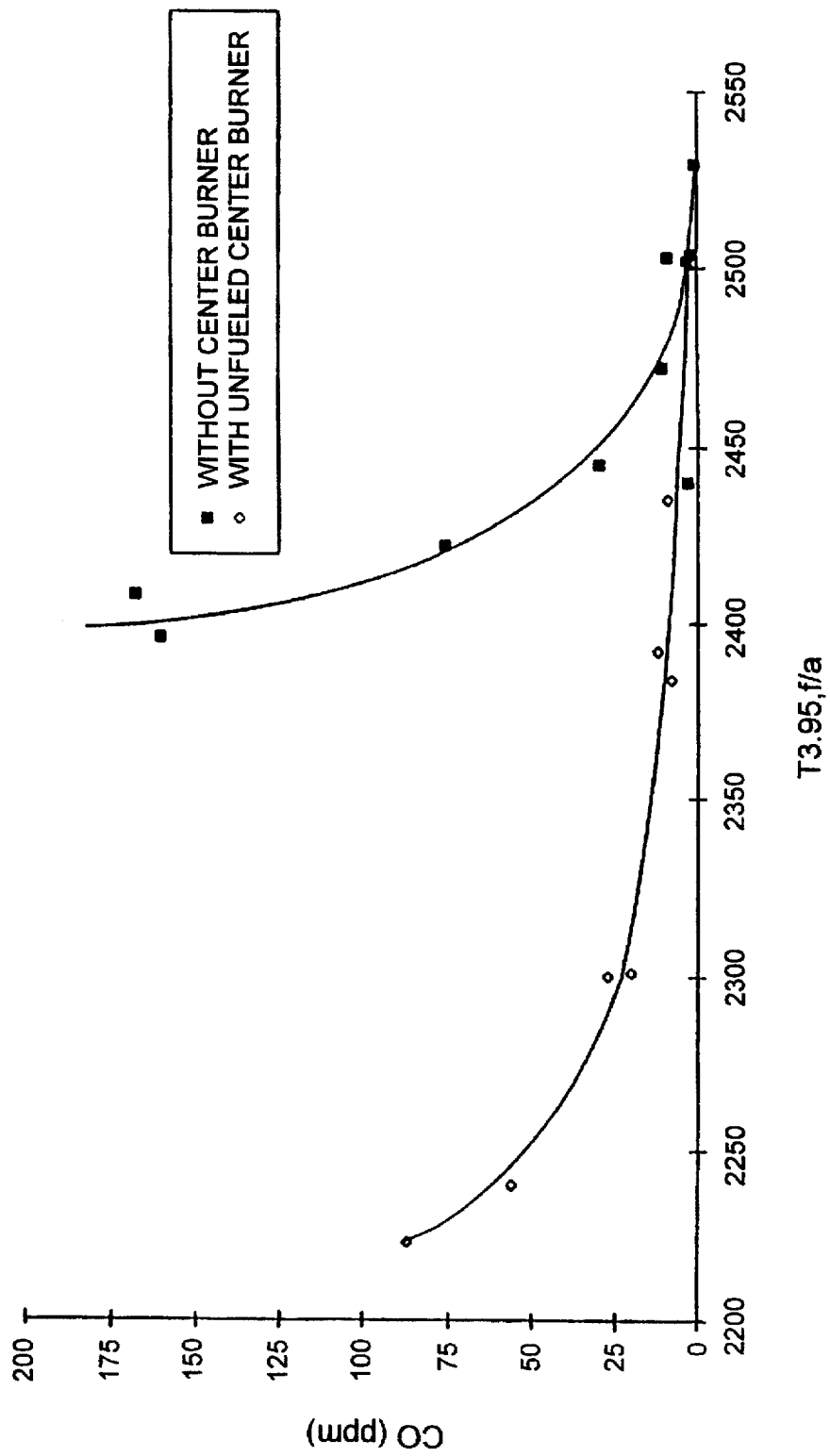
FIG. 7 is a graph comparing CO emissions for a multi-burner combustor without a center burner with a multi-burner combustor having a center burner in accordance with the invention.

FIG. 7 illustrates a comparison of CO emissions for a multi-burner combustor without a center burner or nozzle versus a multi-burner combustor having a center burner or nozzle with 0% fuel supplied to the center nozzle. The graph shows that for the combustor with a center nozzle, approximately 200° F. more turn-down can be attained before any appreciable increase in CO occurs. By not fueling the center nozzle, the air flow through the center nozzle is essentially bypassing the combustion reaction. The air in the center burner is not able to lean out the reaction zone, which would result in higher CO emissions. Additionally, testing of a multi-burner combustor with the unfueled center nozzle indicated that the center nozzle had minimal effect on the dynamic performance of the combustor, and that it did not cause any degradation in flame stability over the pre-mixed operating range.

Utilization of the pre-mix center nozzle 106 also reduces CO and UHC emissions levels and improves stability in low load operation below load condition Ld3. This load range is typically a diffusion mode of operation in a multi-burner combustor, as described in U.S. Pat. No. 5,259,184, issued Nov. 9, 1993, and co-pending application Ser. No. 08/258, 041, filed Jun. 10, 1994. By operating the combustor as described above in the preferred embodiment, CO and UHC emissions at FSNL and very low load (below Ld1) can be greatly reduced relative to diffusion mode operation.

In lab testing of a dual mode, dry low NOx multi-burner combustor during low load diffusion operation, CO emissions typically vary from ~1000 ppmv at full speed no load (FSNL) to ~125 ppmv at 40% load. The UHC emissions vary from ~1400 ppmv to ~15 ppmv over the same load range. These emissions are high because the burner design is optimized for pre-mixed operation. Such a burner design combines a large amount of excess air with poor mixing between the air and diffusion fuel when operating at low burner fuel/air ratios. However, by using the center nozzle only in a pre-mixed mode, the CO/UHC emissions at FSNL can be reduced to 200/100 ppm (compared to 1000/1400 ppm in diffusion operation). By running with one rich pre-mix nozzle instead of multiple very lean diffusion nozzles, better mixing and higher fuel/air ratio are achieved in the flame zone, resulting in lower CO and UHC.

The use of the center nozzle 106 also improves flame stability for low load operation. Typically, operation between full speed, no load and 40% load occurs with some or all of the outer nozzles running in diffusion mode. At very low load in diffusion mode, the low fuel/air ratio in the nozzles makes the flame unstable and prone to blow-out. By running one rich burner in the center at FSNL, in either diffusion or pre-mixed mode, the flame stability can be greatly enhanced. As load is increased, fuel can be gradually added to the outer nozzles, in stages, or to all nozzles at once. Even when the fuel/air ratio in the outer nozzles is very lean, the high fuel/air ratio in the center nozzle will maintain flame stability and will provide an ignition source for the fuel in the outer nozzles. In this arrangement (five annular and one center nozzle), consistent with the discussion above, the two nozzles utilized to cross-tire the turbine are fed fuel from one manifold. The center nozzle is supplied with fuel from a second manifold; and the remaining three annular nozzles are supplied with fuel from a third manifold.

Figure 8:
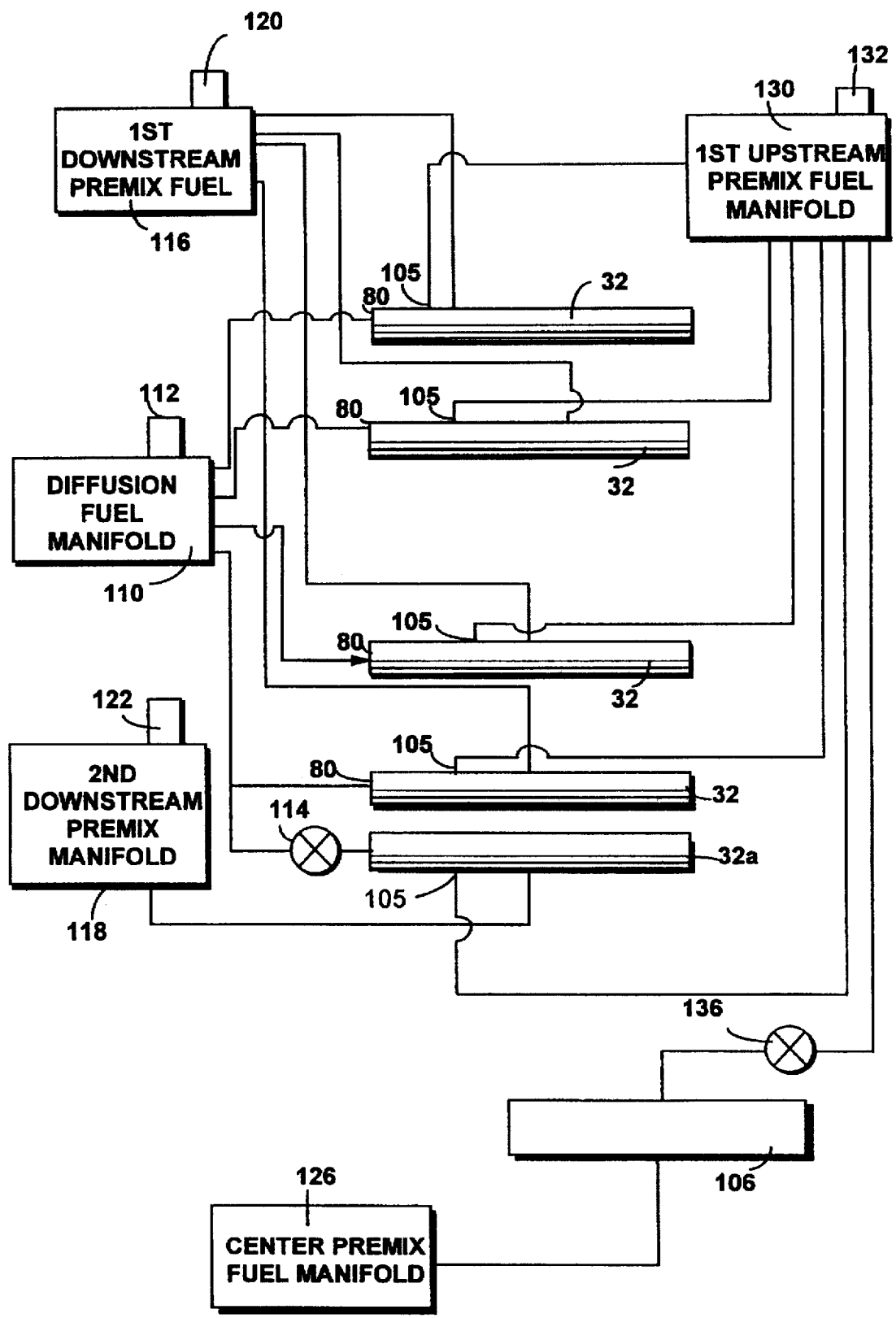
FIG. 8 is a schematic illustration of an alternative embodiment of pre-mix and diffusion fuel supply manifolds for use with the invention.

An alternative fueling scheme is shown in FIG. 8 which incorporates the center nozzle but retains diffusion mode for low load operation. This arrangement is similar to that described in co-pending application Ser. No. 08/258,041 with two exceptions: 1) the addition of a pre-mix only center nozzle and 2) only one upstream pre-mix manifold is here as opposed to two upstream manifolds in Ser. No. 08/258,041. The injection of the pre-mix fuel in the upstream manifold is for the purpose of suppressing dynamic pressure oscillations in full pre-mix operation as described in 08/258,041.

More specifically, a diffusion fuel manifold 110 is provided in FIG. 8 for supplying diffusion fuel to the inlets 80 of the nozzles 32 and 32 a under the control of valve 112. An additional valve 114 may be disposed in the fuel line to nozzle 32a if desired. There are four fuel lines from the first downstream pre-mix fuel manifold 116 to four of the nozzles 32. There is one second downstream pre-mix fuel manifold 118 supplying fuel to the nozzle 32a, under control of valve 122. Otherwise, the arrangement is substantially as shown and described in conjunction with FIG. 6.

Initially, operation of the combustor is similar to that described in co-pending application Ser. No. 08/258,112. Referring to FIG. 8, at start-up the valve 112 is opened to supply diffusion fuel from the manifold 110 to the four diffusion nozzles 32 (and optionally to the nozzle 32a— otherwise nozzle 32a is used to supply only air during start-up) where ignition takes place. At part speed, no load, a transition occurs to the extent that pre-mix fuel is supplied to the nozzle 32a from the second pre-mix manifold 118. This fueling scheme is continued to FSNL. The center nozzle 106 remains unfueled.

Load is applied up to Ld3 (as in the preferred embodiment), at which point the combustor is transferred to full pre-mix operation by fueling the four nozzles 32 from the first pre-mix manifold 116 and shutting off diffusion fuel flow from manifold 110. At this point, some of the pre-mix fuel to the outer nozzles will also be supplied from the upstream manifold 130 for the purpose of suppressing dynamic pressure oscillations. In full pre-mix operation, as load is increased further, pre-mix fuel is gradually added to the center nozzle 106 via manifold 126, while holding the fuel flow to the annular array of burners 32 and 32a constant. Optionally, valve 136 can be opened to also supply upstream fuel to the center pre-mix nozzle. Fuel is added to the center nozzle 106 until the fuel air/ratio of the center pre-mix nozzle is substantially the same as the fuel/air ratio of the outer nozzles. At this point, the fuel/air ratio is increased uniformly to all nozzles as load is increased to full load.

As in the preferred embodiment, this alternative fueling scheme has the same benefit of extending turndown in full pre-mixed operation while still maintaining low NOx, CO, and UHC emissions. As described above, when unloading from full load, the fuel flow is reduced uniformly to all nozzles until the lean blow-out threshold is reached. Absent the center nozzle, at this point, the combustor would have to transfer to diffusion mode (and suffer higher NOx) if load were further reduced. With the center nozzle present, load can be decreased by reducing fuel to the center nozzle while holding fuel to the outer nozzles constant. Thus, the range of pre-mixed operation with low emissions is extended to the point where fuel to the center nozzle is completely shut off. At that point, transfer to diffusion mode must be made.

Relative to the preferred embodiment, low load CO and UHC emissions will be higher because FSNL and low load operation is in diffusion mode instead of center nozzle only pre-mixed mode.

An additional benefit of the invention is that it provides a means of puffing more burner flow area into a combustion system of a given diameter. In a combustor of given diameter for which the burner diameter has already been maximized, the greater flow area provided by the center burner or nozzle 106 provides two potential advantages: 1) For a given head end air flow, the additional flow area will reduce combustor pressure drop, resulting in improved output and efficiency of the gas turbine; and 2) the additional flow area allows for increasing the burner air flow without incurring any additional pressure drop. Increasing the burner air flow is necessary when trying to reduce the burner fuel/air ratio so as to achieve lower NOx emissions.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. In a single stage gas turbine combustor capable of operating in pre-mix and diffusion modes having an annular array of nozzles arranged about a center axis, wherein said nozzles in said annular array are connected to both pre-mix and diffusion fuel sources, the improvement comprising a center pre-mix nozzle located on said center axis, and including a separate manifold for supplying only pre-mix fuel to the center nozzle.

\* \* \* \* \*